(12) United States Patent
Degrange

(10) Patent No.: US 9,958,849 B2
(45) Date of Patent: May 1, 2018

(54) CEMENT DATA TELEMETRY VIA DRILL STRING

(71) Applicant: Schlumberger Technology Corporation, Sugar Land, TX (US)

(72) Inventor: Jean-Marie Degrange, Houston, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 1381 days.

(21) Appl. No.: 13/771,086

(22) Filed: Feb. 20, 2013

(65) Prior Publication Data
US 2014/0236357 A1    Aug. 21, 2014

(51) Int. Cl.
| | | |
|---|---|---|
| E21B 47/00 | (2012.01) | |
| G05B 19/048 | (2006.01) | |
| E21B 47/12 | (2012.01) | |
| E21B 47/18 | (2012.01) | |

(52) U.S. Cl.
CPC ........ G05B 19/048 (2013.01); E21B 47/0005 (2013.01); E21B 47/124 (2013.01); E21B 47/18 (2013.01)

(58) Field of Classification Search
CPC ... G05B 19/048; E21B 47/0005; E21B 47/18; E21B 47/124
USPC ........................................................ 700/275
See application file for complete search history.

(56) References Cited

U.S. PATENT DOCUMENTS

| | | | |
|---|---|---|---|
| 4,454,756 A | 6/1984 | Sharp et al. | |
| 5,517,464 A | 5/1996 | Lerner et al. | |
| 7,400,262 B2 * | 7/2008 | Chemali | E21B 17/028 340/853.1 |
| 7,639,563 B2 | 12/2009 | Wu et al. | |
| 2002/0149501 A1* | 10/2002 | Beique | E21B 17/14 340/854.5 |
| 2007/0223822 A1* | 9/2007 | Haugland | G01V 11/002 382/232 |
| 2012/0080184 A1 | 4/2012 | Jahangir et al. | |
| 2012/0097450 A1 | 4/2012 | Wessling et al. | |
| 2013/0020074 A1 | 1/2013 | Kischkat et al. | |

FOREIGN PATENT DOCUMENTS

EP    0078906    5/1983

OTHER PUBLICATIONS

International search report and written opinion for the equivalent PCT patent application No. PCT/IB2014/059072 dated May 26, 2014.

* cited by examiner

*Primary Examiner* — Carlos Ortiz Rodriguez

(57) ABSTRACT

A method can include acquiring data via a receiver mounted in a drill string during tripping of the drill string downward into a wellbore (e.g., including a casing and a cement annulus about the casing) where the acquired data can be for evaluation of at least one characteristic of cement; buffering at least a portion of the acquired data to a memory device mounted in the drill string; and while pumping drilling fluid through a passage in the drill string, as disposed in the wellbore, transmitting at least a portion of the buffered data via mud-pulse telemetry.

14 Claims, 10 Drawing Sheets

CEMENT DATA TELEMETRY VIA DRILL STRING

BACKGROUND

Data acquired by a tool in a drill string located in a wellbore may assist with various aspects of wellsite development and management. However, such data may not be available until the drill string is removed from the wellbore. As an example, consider a drill string tripped tens of thousands of feet into a wellbore where its removal may take days. In such an example, a team may schedule resources according to an expected arrival date for evaluation of the acquired data upon removal of the drill string. Where decisions stemming from such an evaluation affect subsequent action, development or management of the wellsite may be delayed, at substantial cost. Various examples of techniques and technologies described herein may help mitigate such delays or provide other benefits.

SUMMARY

A method can include acquiring data via a receiver mounted in a drill string during tripping of the drill string downward into a wellbore where the acquired data can be for evaluation of at least one characteristic of cement; buffering at least a portion of the acquired data to a memory device mounted in the drill string; and while pumping drilling fluid through a passage in the drill string, as disposed in the wellbore, transmitting at least a portion of the buffered data via mud-pulse telemetry. As an example, a downhole tool can include a processor, a memory device with memory and processor-executable instructions stored in the memory of the memory device, for example, to instruct the processor to acquire data via a receiver mounted in a drill string during tripping of the drill string downward into a wellbore (e.g., where the acquired data may conform to a technique for evaluation of at least one characteristic of cement); buffer at least a portion of the acquired data to the memory device (e.g., or other memory device); and, while pumping drilling fluid through a passage in the drill string, as disposed in the wellbore, transmit at least a portion of the buffered data via mud-pulse telemetry. As an example, one or more computer-readable storage media can include computer-executable instructions to instruct a computing device to program a data acquisition period for data acquisition equipment of a drill string during a downward leg of a trip of the drill string into a wellbore (e.g., where the to be acquired data can be for evaluation of at least one characteristic of cement); in accordance with an evaluation technique, evaluate at least a portion of the acquired data as received via mud-pulse telemetry during pumping of drilling fluid through a passage of the drill string with the drill string disposed in the wellbore; and, based at least in part on the evaluation, program a subsequent data acquisition period for the data acquisition equipment or other data acquisition to be tripped in the wellbore. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
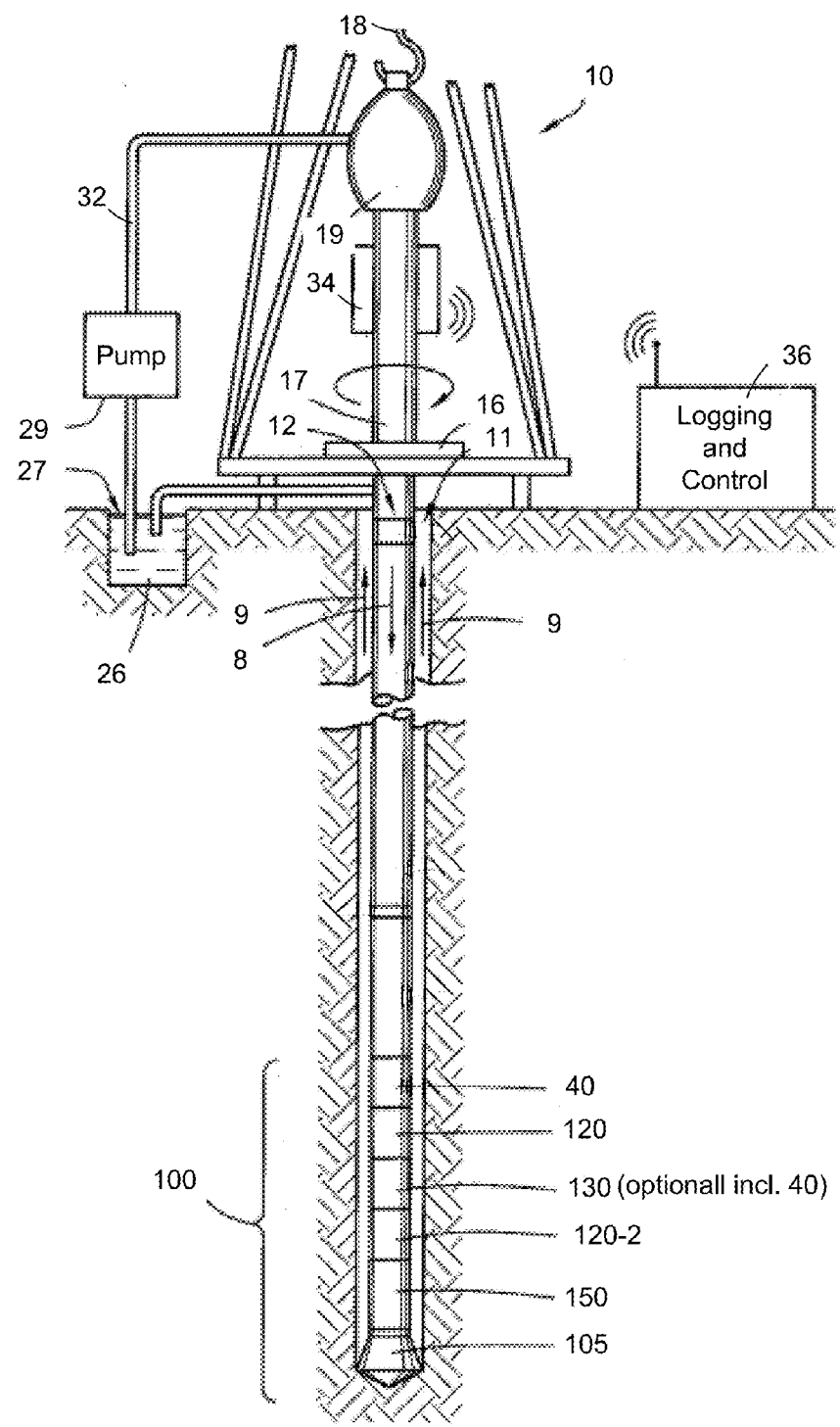
FIG. 1 illustrates an example system for logging data.

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

During a drilling operation, a tool that includes a sensor may be positioned in a borehole for acquisition of information (e.g., via sensing, measuring, etc.). Where cement has been deposited in the borehole (e.g., between a bore wall and a casing), the sensor may acquire information relevant to one or more characteristics of the cement and optionally store the acquired information in memory of a memory device of the tool. In such an example, an analysis may be performed on the acquired information, optionally in real-time, in a delayed manner (e.g., reading the acquired information from memory) or both. As an example, one or more actions may occur based at least in part on such an analysis. For example, where the analysis determines that the acquired information is germane to cement quality, the information may be marked for further analysis, surface transmission, etc. As to further analysis, consider a section of the borehole that includes cement where a time-lapse analysis analyzes acquired information from a downward journey of the tool and acquired information from an upward journal of the tool to assess quality of the cement with respect to time (e.g., setting, voids, bonding, etc.). As to surface transmission, consider marking the acquired information for storage in memory of the memory device of the tool and for transmission from the memory device to surface equipment using mud-pulse telemetry upon commencement of mud pumping (e.g., optionally associated with a drilling operation).

As an example, acquired information may be stored, analyzed or both in a manner independent of tool movement (e.g., along a borehole axis). As an example, acquired information may be stored, analyzed or both while a tool is stationary, during a downward trip of the tool, during an upward trip of the tool, or during a drill string action (e.g., a drilling operation). As an example, where transmission of information (e.g., acquired information, a result based in part on acquired information or both) occurs via mud-pulse telemetry, at least a portion of the information may be compressed using one or more compression techniques (e.g., optionally for subsequent decompression by surface equipment). As an example, a portion of stored information in a tool may be transmitted to surface equipment using mud-pulse telemetry in response to a command that calls for transmission of that portion of stored information (e.g., which may pertain to a particular section or sections of a borehole, etc.). Such a process may optionally occur while additional information is acquired, analyzed, etc., by the tool. As an example, one or more transmission decisions may optionally account for bandwidth of a transmission technique. For example, a mud-pulse telemetry technique may have one or more bandwidth limitations (e.g., optionally dependent on distance, mud characteristics, etc.) that may be taken into account when making a transmission decision.

As an example, a method may include analyzing information while a tool is positioned in a borehole. For example, such analyzing may be performed via circuitry of the tool, circuitry of surface equipment or both. As to an analysis of information being performed via circuitry of surface equipment, such information may be transmitted to the surface equipment via a telemetry technique such as, for example, mud-pulse telemetry. Such a method may expedite analysis of cement, for example, without having to wait for trip completion (e.g., removal of the tool from the borehole). Thus, as an example, a method may save time by allowing for early decision making, which may thereby enhance one or more drilling operations.

FIG. 1 illustrates a wellsite system in which various example embodiments may be employed (e.g., at a wellsite that may be onshore or offshore). In the example system of FIG. 1, a borehole 11 is formed in subsurface formations by rotary drilling; noting that various example embodiments may also use directional drilling. As shown, a drill string 12 is suspended within the borehole 11 and has a bottom hole assembly 100 that includes a drill bit 105 at its lower end. A surface system provides for operation of the drill string 12 and other operations and includes platform and derrick assembly 10 positioned over the borehole 11, the assembly 10 including a rotary table 16, a kelly 17, a hook 18 and a rotary swivel 19. As indicated by an arrow, the drill string 12 can be rotated by the rotary table 16, energized by means not shown, which engages the kelly 17 at the upper end of the drill string 12. The drill string 12 is suspended from a hook 18, attached to a traveling block (not shown), through the kelly 17 and a rotary swivel 19 which permits rotation of the drill string 12 relative to the hook 18. As an example, a top drive system may be suitably used.

In the example of this embodiment, the surface system further includes drilling fluid (e.g., mud, etc.) 26 stored in a pit 27 formed at the wellsite. As an example, a wellbore may be drilled to produce fluid, inject fluid or both (e.g., hydrocarbons, minerals, water, etc.). In the example of FIG. 1, the drill string 12 (e.g., including one or more downhole tools) may be composed of a series of pipes threadably connected together to form a long tube with the drill bit 105 at the lower end thereof. As the drill tool 12 is advanced into a wellbore for drilling, at some point in time prior to or coincident with drilling, the drilling fluid 26 may be pumped by a pump 29 from the pit 27 (e.g., or other source) via a line 32 to a port in the swivel 19 to a passage (e.g., or passages) in the drill string 12 and out of ports located on the drill bit 105 (see, e.g., a directional arrow 8). As the drilling fluid 26 exits the drill string 12 via ports in the drill bit 105, it then circulates upwardly through an annular region between an outer surface(s) of the drill string 12 and surrounding wall(s) (e.g., open borehole, casing, etc.), as indicated by directional arrows 9. In such a manner, the drilling fluid 26 lubricates the drill bit 105 and carries heat energy (e.g., frictional or other energy) and formation cuttings to the surface where the drilling fluid 26 (e.g., and cuttings) may be returned to the pit 27, for example, for recirculation (e.g., with processing to remove cuttings, etc.).

The drilling fluid 26 pumped by the pump 29 into the drill string 12 may, after exiting the drill string 12, form a mudcake that lines the wellbore which, among other functions, may reduce friction between the drill string 12 and surrounding wall(s) (e.g., borehole, casing, etc.). A reduction in friction may facilitate advancing or retracting the drill string 12. During a drilling operation, the entire drill string 12 may be pulled from a wellbore and optionally replaced, for example, with a new or sharpened drill bit, a smaller diameter drill string, etc. The act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 105 of the drill string 12 at a bottom of a wellbore, pumping of the drilling fluid 26 commences to lubricate the drill bit 105 for purposes of drilling to enlarge the wellbore. As mentioned, the drilling fluid 26 is pumped by pump 29 into a passage of the drill string 12 and, upon filling of the passage, the drilling fluid 26 may be used as a transmission medium to transmit energy, for example, energy that may encode information as in mud-pulse telemetry (see, e.g., various mud-pulse telemetry systems as described in U.S. Pat. No. 5,517,464, entitled "Integrated modulator and turbine-generator for a measurement while drilling tool" to Learner et al., assigned to Schlumberger Technology Corporation, which is incorporated by reference herein).

As an example, mud-pulse telemetry equipment may include a downhole device configured to effect changes in pressure in the drilling fluid 26 to create an acoustic wave or waves upon which information may modulated. In such an example, information from downhole equipment (e.g., one or more modules of the drill string 12) may be transmitted uphole to an uphole device 34, which may relay such information to other equipment 36 for processing, control, etc.

As an example, the drill string 12 may be fitted with telemetry equipment 40 that includes a rotatable drive shaft, a turbine impeller mechanically coupled to the drive shaft such that the drilling fluid 26 can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the drilling fluid 26, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the drilling fluid 26. In the example of FIG. 1, the uphole device 34 may include circuitry to sense pressure pulses generated by telemetry equipment 40 and, for example, communicate sensed pressure pulses or information derived therefrom to the equipment 36 for process, control, etc.

The bottom hole assembly 100 of the illustrated embodiment includes a logging-while-drilling (LWD) module 120, a measuring-while-drilling (MWD) module 130, a rotosteerable system and motor 150, and a drill bit 105.

The LWD module 120 can be housed in a suitable type of drill collar and can contain one or a plurality of selected types of logging tools. It will also be understood that more than one LWD and/or MWD module can be employed, for example, as represented at by a portion 120-2 of the drill string 12. Where the position of an LWD module is mentioned, as an example, it may refer to a module at the position of the LWD module 120, the portion 120-2, etc. An LWD module can include capabilities for measuring, processing, and storing information, as well as for communicating with the surface equipment. In the illustrated embodiment, the LWD module 120 includes a seismic measuring device.

The MWD module 130 can also be housed in a suitable type of drill collar and can contain one or more devices for measuring characteristics of the drill string 12 and drill bit 105. As an example, the MWD tool 130 may include equipment for generating electrical power, for example, to power various components of the drill string 12. As an example, the MWD tool 130 may include the telemetry equipment 40, for example, where the turbine impeller can generate power by flow of the drilling fluid 26; it being understood that other power and/or battery systems may be employed for purposes of powering various components. As an example, the MWD module 130 may include one or more of the following types of measuring devices: a weight-on-bit measuring device, a torque measuring device, a vibration measuring device, a shock measuring device, a stick slip measuring device, a direction measuring device, and an inclination measuring device.

Figure 2:
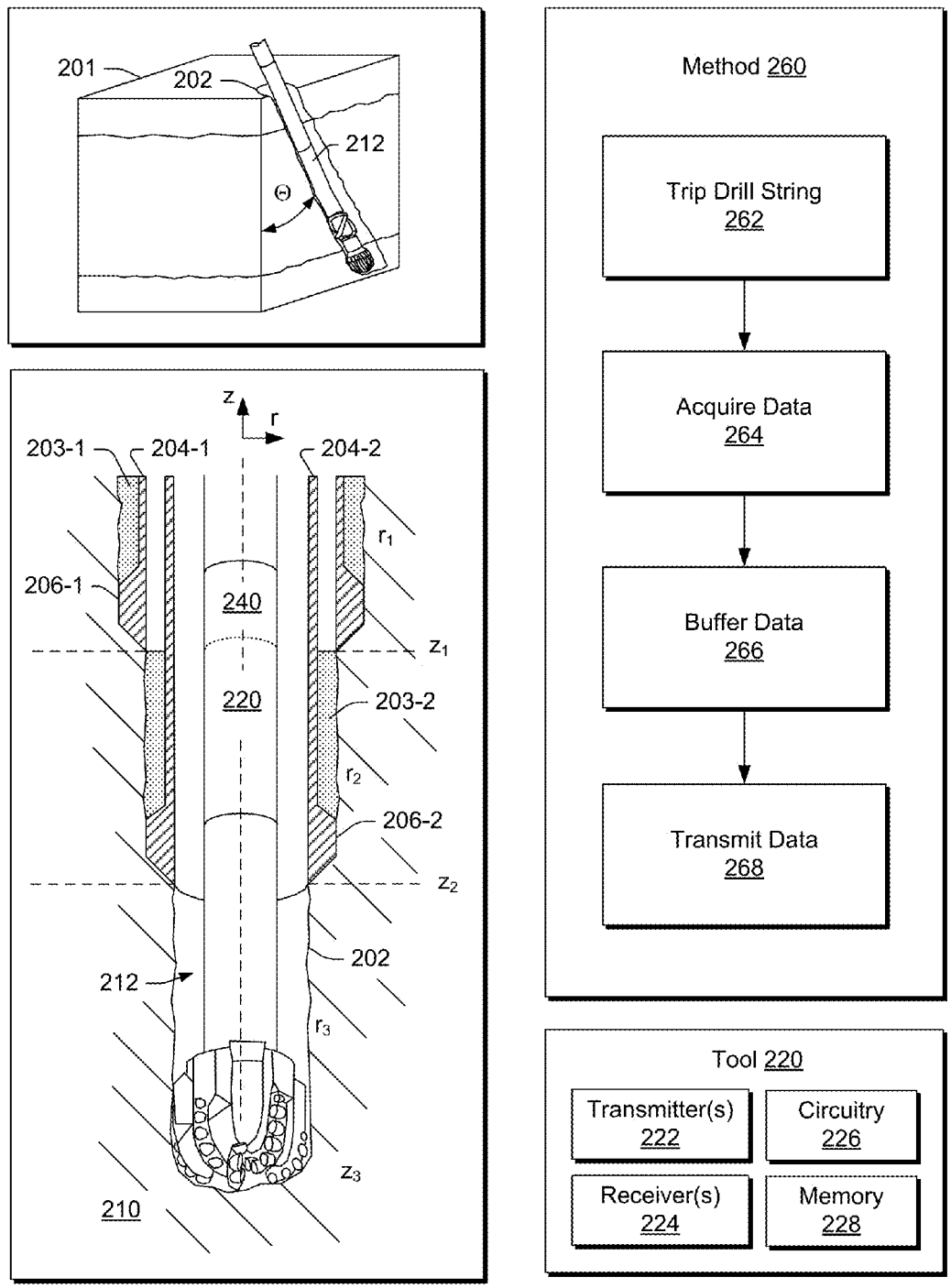
FIG. 2 illustrates an example of a wellbore, an example of a tool and an example of a method.

FIG. 2 illustrates an example of a system 210 that includes a drill string 212 with an LWD tool (or module) 220 and telemetry equipment 240 (e.g., which may be part of the tool 220 or another tool) and an example of a method 260 that may be implemented using the system 210. In the example of FIG. 2, the system 210 is illustrated with respect to a wellbore 202 (e.g., a borehole) in a portion of a subterranean formation 201 (e.g., a sedimentary basin). The wellbore 202 may be defined in part by an angle ($\Theta$); noting that while the wellbore 202 is shown as being deviated, it may be vertical (e.g., or include one or more vertical sections along with one or more deviated sections). As shown in an enlarged view with respect to an r, z coordinate system (e.g., a cylindrical coordinate system), a portion of the wellbore 202 includes casings 204-1 and 204-2 having casing shoes 206-1 and 206-2. As shown, cement annuli 203-1 and 203-2 are disposed between the wellbore 202 and the casings 204-1 and 204-2. Cement such as the cement annuli 203-1 and 203-2 can support and protect casings such as the casings 204-1 and 204-2 and when cement is disposed throughout various portions of a wellbore such as the wellbore 202, cement can help achieve zonal isolation.

In the example of FIG. 2, the wellbore 202 has been drilled in sections or segments beginning with a large diameter section (see, e.g., $r_1$) followed by an intermediate diameter section (see, e.g., $r_2$) and a smaller diameter section (see, e.g., $r_3$). As an example, a large diameter section may be a surface casing section, which may be three or more feet in diameter and extend down several hundred feet to several thousand feet. A surface casing section may aim to prevent washout of loose unconsolidated formations. As to an intermediate casing section, it may aim to isolate and protect high pressure zones, guard against lost circulation zones, etc. As an example, intermediate casing may be set at about 6000 feet and extend lower with one or more intermediate casing portions of decreasing diameter (e.g., in a range from about thirteen to about five inches in diameter). A so-called production casing section may extend below an intermediate casing section and, upon completion, be the longest running section within a wellbore (e.g., a production casing section may be thousands of feet in length). As an example, production casing may be located in a target zone where the casing is perforated for flow of fluid into a lumen of the casing.

Prior to introducing cement into an annulus between a bore and a casing, calculations may be performed to estimate an amount of cement sufficient to fill the annulus, for example, for purposes of sealing off a casing segment. Accuracy of an estimate as to the amount of cement as well as issues in a process of introducing cement may, for example, result in occasional voids or gaps (e.g., regions where cement is lacking). Depending on the nature of such voids or gaps, casing or borehole integrity may be at risk or compromised. However, where one or more integrity detection techniques can be implemented, it may be possible to detect voids or gaps and call for remedial action, alteration of a plan, etc.

Referring again to the LWD tool 220 of FIG. 2, it may carry one or more transmitters 222 and one or more receivers 224. For example, the SonicScope™ tool marketed by Schlumberger Ltd. (Houston, Tex.) carries a wideband multipole transmitter and 48 wideband receivers. The multipole transmitter provides for transmission of high-frequency monopole energy (e.g., for compressional and shear slowness in fast formation), low-frequency monopole energy (e.g., for Stoneley waves) and quadrupole energy (e.g., for shear slowness in slow formations). The 48 wideband receivers provide for digitization of sensed signals and inter-receiver sampling to address aliasing.

In the example of FIG. 2, the LWD tool 220 includes circuitry 226 and a memory device 228 with memory for storage of data (e.g., information), for example, signals sensed by one or more receivers 224 and processed by the circuitry 226 of the LWD tool 220. As an example, the LWD tool 220 may buffer data to the memory device 228. As an example, data buffered in the memory device 228 may be read from the memory device 228 and transmitted to a remote device using a telemetry technique such as mud-pulse telemetry (e.g., via the circuitry 226 and telemetry equipment 240). As an example, the telemetry equipment may include one or more features of the telemetry equipment 40 of FIG. 1.

In the example of FIG. 2, the method 260 includes a trip block 262 for tripping a drill string in a wellbore, an acquisition block 264 for acquiring data during the trip, a buffer block 266 for buffering acquired data during the trip and a transmission block 268 for transmitting buffered data. As an example, the transmission block 268 may include transmitting buffered data (e.g., information) via mud-pulse telemetry where pumping of drilling fluid (e.g., mud, etc.) has commenced (e.g., at or near the end of the trip). For example, during a trip mud-pulse telemetry may not be possible or practical as it may depend on actual pumping of drilling fluid (e.g., mud) as a medium for data transmission. However, once a drill string has been tripped to or beyond a lowermost casing shoe, pumping of drilling fluid may commence, which may pass via a turbine impeller of a telemetry system configured to impart pressure pulses (see, e.g., the telemetry equipment 40 of FIG. 1). As an example, pumping of drilling fluid may commence with drilling, which may, in turn, optionally trigger transmission of at least a portion of buffered data via mud-pulse telemetry.

As an example, a method can include acquiring data via a receiver mounted in a drill string during tripping of the drill string downward into a wellbore (e.g., a wellbore that includes a casing and a cement annulus about the casing) where the acquired data conforms to a technique for evaluation of at least one characteristic of cement; buffering at least a portion of the acquired data to a memory device mounted in the drill string; and while pumping drilling fluid through a passage in the drill string, as disposed in the wellbore, transmitting at least a portion of the buffered data via mud-pulse telemetry.

As an example, a method can include commencing pumping of drilling fluid through a passage in a drill string after passing at least a drill bit of the drill string past a casing shoe of a casing.

As an example, a method can include receiving at least a portion of transmitted buffered data at a remote location via mud-pulse telemetry and evaluating at least one characteristic of cement in a cement annulus based on the received data.

As an example, a method can include programming data acquisition circuitry in a drill string prior to tripping the drill string. For example, such programming may be based in part on a technique for evaluation of at least one characteristic of cement. As an example, programming of data acquisition circuitry may be based in part on data acquired during a prior trip of a drill string into a wellbore.

As an example, technique for evaluation of at least one characteristic of cement may provide for evaluation of at least one of cement quality, top of cement, cement bound, and cement curing.

As an example, a method can include receiving at least a portion of transmitted buffered data at a remote location via mud-pulse telemetry and evaluating at least one characteristic of cement disposed in a wellbore while using a drill string to drill and enlarge the wellbore.

As an example, a method can include using one or more compression algorithms implemented by compression circuitry in a drill string, for compressing acquired data, compressing buffered data or compressing acquired data and buffered data (e.g., where the acquired data is acquired by a tool in the drill string).

As an example, a method may include receiving a downlink command while pumping drilling fluid through a passage in a drill string where the downlink command calls for the transmitting at least a portion of buffered data stored in memory of a memory device in the drill string via mud-pulse telemetry (e.g., to a remote, uphole location). As an example, the downlink command may be issued in response to a flag transmitted previously via mud-pulse telemetry, for example, where the flag is associated with a portion of the buffered data to be transmitted via mud-pulse telemetry (see, e.g., the methods 690 and 694 of FIG. 6). As an example, a flag may be or include a code. As an example, such a code may be associated with one or more issues (see, e.g., the table 680 of FIG. 6).

As an example, a method can include receiving a downlink command while pumping drilling fluid through a passage in a drill string where the downlink command calls for acquiring data during tripping of the drill string upward in a wellbore.

As an example, to implement an integrity detection technique (e.g., for evaluating integrity of cement), the LWD tool 220 may emit energy using the transmitter(s) 222 (e.g., a monopole transmitter, a multi-pole transmitter or both) to excite a casing mode; noting that flow of drilling fluid (e.g., mud, etc.) through nozzles at a drill bit of the drill string 212 may also excite a casing mode (e.g., sensing of casing vibration may occur without turning on a transmitter). As to monopole excitation using a transmitter, as an example, the transmitter may be instructed to emit energy with a center frequency between about 10 kHz and about 30 kHz for purposes of exciting a casing mode. In such an example, to enhance dynamic range of data acquisition and signal-to-noise ratio, a high-pass or band-pass filter of about 10 kHz to about 30 kHz may be applied to received signals to remove lower frequency tube or Stoneley wave information (e.g., prior to signal digitization). As an example, one or more techniques or technologies described in U.S. Pat. No. 7,639,563 B2, entitled "Method for sonic indication of voids in casing cement", to Wu et al., assigned to Schlumberger Technology Corporation, which is incorporated by reference herein, may be implemented for evaluation of cement.

As an example, amplitude data from one or multiple sonic sensors (e.g., receivers) may be transmitted from a downhole tool to a remote location via telemetry (e.g., via mud-pulse telemetry). In such an example, the data may be available for surface processing for interpretation and for evaluation of one or more of cement quality, top of cement, cement bound, and cement curing process. For example, such evaluation may be made for one or more sections above an open hole section (e.g., below a lowermost casing shoe). As an example, data from one or more modules may be transmitted via mud-pulse telemetry during pumping of drilling fluid, whether a drill string has passed downward beyond a lowermost casing shoe or not. In such an example, transmission of buffered data may occur via mud-pulse telemetry and the transmitted data may be processed and evaluated, for example, even before a lower end of the drill string reaches an open hole section (e.g., below a lowermost casing shoe). As an example, a method may include, based at least in part on status of cement (e.g., cement quality, etc.), determining one or more parameters for setting a whipstock.

As an example, a top of cement (TOC) identification process may include buffering data while tripping a drill string in a wellbore, pumping drilling fluid, transmitting the buffered data to a remote location via mud-pulse telemetry and processing the transmitted data to identify a TOC location in the wellbore.

As an example, a casing shoe identification process may include buffering data while tripping a drill string in a wellbore, pumping drilling fluid, transmitting the buffered data to a remote location via mud-pulse telemetry and processing the transmitted data to identify a casing shoe location in the wellbore.

As an example, while tripping in a borehole, downhole data are buffered for a period of time and at least a portion of the buffered data is transmitted during pumping of drilling fluid via mud-pulse telemetry. In such an example, buffered data may be time-stamped or otherwise stamped with an indicator that can be correlated to depth. For example, where a trip is planned (e.g., trip speed(s) and timings are known a priori) acquisition equipment may be programmed to acquire and buffer data at certain depths.

Figure 3:
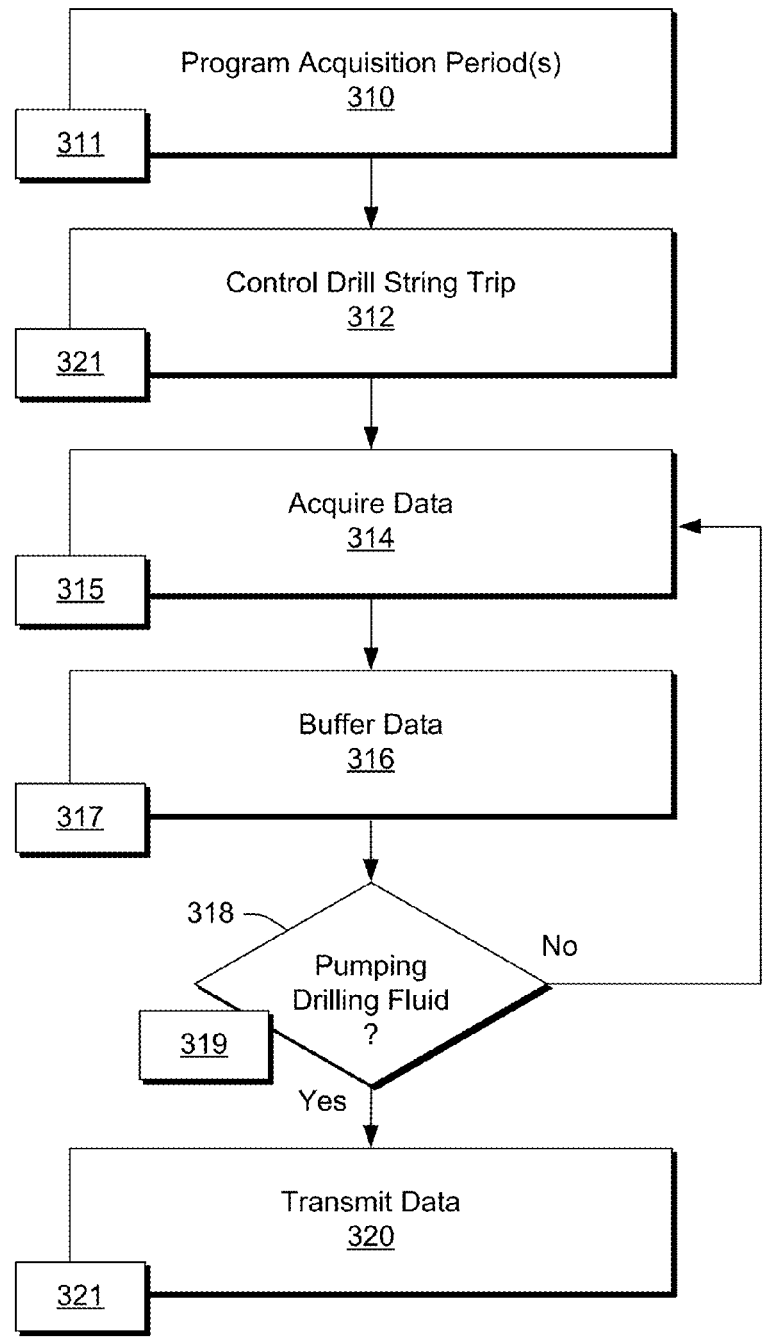
FIG. 3 illustrates an example of a method.

FIG. 3 shows an example of a method 300 that includes a program block 310 for programming one or more acquisition periods, a control block 312 for controlling a drill string trip (e.g., tripping a drill string), an acquisition block 314 for acquiring data during the trip according to the programming of one or more acquisition periods, a buffer block 316 for buffering at least a portion of the acquired data (e.g., or data as to information derived therefrom), a decision block 318 that decides whether drilling fluid is being pumped and a transmission block 320 for transmitting at least a portion of the buffered data depending at least in part on the decision of the decision block 318. For example, if the decision block 318 decides that drilling fluid is not being pumped, then the method 300 may continue to the acquisition block 314, enter a wait block (not shown) or take other action. Where the decision block 318 decides that drilling fluid is being pumped, then the method 300 may continue to the transmission block 320 and transmit at least a portion of the buffered data via telemetry (e.g., mud-pulse telemetry that is enabled by pumping of drilling fluid).

FIG. 3 also shows various computer-readable storage media blocks 311, 313, 315, 317, 319 and 321 (CRM), which may include computer-executable instructions to instruct a computing device to perform one or more acts of the method 300. While individual CRM blocks are shown, a single CRM may include instructions for performing one or more acts associated with the method 300.

Figure 4:
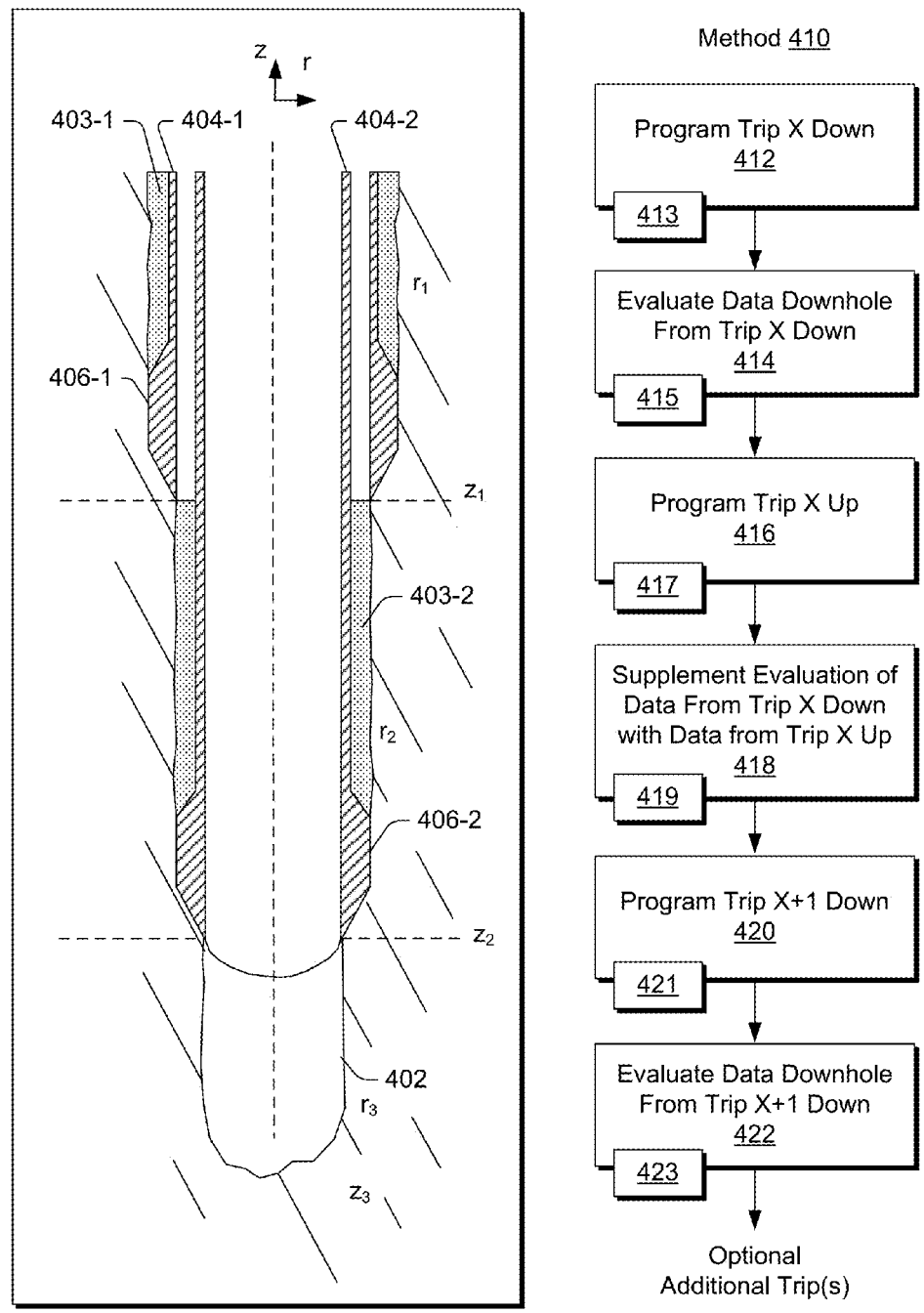
FIG. 4 illustrates an example of a wellbore and an example of a method.

FIG. 4 shows an example of a wellbore 402 and an example of a method 410. The wellbore 402 is shown with respect to an r, z coordinate system (e.g., a cylindrical coordinate system) where a portion of the wellbore 402 includes casings 404-1 and 404-2 having casing shoes 406-1 and 406-2. As shown, cement annuli 403-1 and 403-2 are disposed between the wellbore 402 and the casings 404-1 and 404-2. Cement such as the cement annuli 403-1 and 403-2 can support and protect casings such as the casings 404-1 and 404-2 and when cement is disposed throughout various portions of a wellbore such as the wellbore 402, cement can help achieve zonal isolation.

In the example of FIG. 4, the wellbore 402 has been drilled in sections or segments beginning with a large diameter section (see, e.g., $r_1$) followed by an intermediate diameter section (see, e.g., $r_2$) and a smaller diameter section (see, e.g., $r_3$). As an example, a large diameter section may be a surface casing section, which may be three or more feet in diameter and extend down several hundred feet to several thousand feet. A surface casing section may aim to prevent washout of loose unconsolidated formations. As to an intermediate casing section, it may aim to isolate and protect high pressure zones, guard against lost circulation zones, etc. As an example, intermediate casing may be set at about 6000 feet and extend lower with one or more intermediate casing portions of decreasing diameter (e.g., in a range from about thirteen to about five inches in diameter). A so-called production casing section may extend below an intermediate casing section and, upon completion, be the longest running section within a wellbore (e.g., a production casing section may be thousands of feet in length). As an example, production casing may be located in a target zone where the casing is perforated for flow of fluid into a lumen of the casing.

As mentioned, the wellbore 402 has been drilled in first section, a second section and a third section where each of the three sections has a respective diameter, decreasing from the first section to the third section. In the example of FIG. 4, at least three drill string trips have been made, for example, a first trip with a drill string to drill the first section, a second trip with a drill string to drill the second section and a third trip with a drill string to drill the third section.

As an example, consider a downward leg of the second trip where the drill string to drill the second section is advanced to the casing shoe 406-1 of the casing 404-1 of the first section and a logging tool has been pre-programmed to acquire and buffer data during the downward leg of the second trip where the data is acquired for at least one portion of the first section (e.g., as to cement quality of the cement 403-1). In such an example, the logging tool may include a circuitry to process the data acquired during the downward leg of the trip, even at a rudimentary level, and, in turn, identify a desire for data acquisition during an upward leg of the second trip and program one or more parameters for data acquisition, buffering, etc., during the upward leg of the second trip.

In the foregoing example, at the end of the downward leg of the second trip, upon pumping of drilling fluid, the drill string may commence mud-pulse telemetry of the acquired, buffered data from the downward leg of the second trip to a remote location for evaluation (e.g., to equipment at a surface location). In such an example, an evaluation may commence using the communicated data from the downward leg of the second trip and, if desired, at the end of the upward leg of the second trip, the evaluation may be supplemented by data acquired during the upward leg of the second trip.

The foregoing example illustrates a technique that can expedite evaluation and operational decision making (e.g., planning of time, resources, etc.). For example, if the data from the downward leg of the second trip suffices for an evaluation of cement quality of the cement 403-1, then there may be no need to devote time and resources to retrieval and analysis of any data acquired during the upward leg of the second trip. However, where a desire does exist to supplement the evaluation of the cement quality (e.g., based in part on a prior evaluation), time and resources may be planned appropriately for further evaluation upon arrival of the data at the end of the upward leg of the second trip. Various examples described herein stand in contrast to a technique that recovers data at the end of the upward leg of the second trip when the drill string has been removed from the wellbore.

In the example of FIG. 4, the method 410 includes a program block 412 to program data acquisition during a downward leg of a trip X (e.g., a first trip or a latter trip), an evaluation block 414 to evaluate data from the downward leg of trip X, a program block 416 to program data acquisition during an upward leg of trip X (e.g., optionally based at least in part on the evaluation of data from the downward leg of trip X), a supplemental evaluation block 418 to supplement evaluation of data from the downward leg of the trip X with data from the upward leg of trip X, a program block 420 to program data acquisition during a downward leg of a trip X+1 (e.g., optionally based at least in part on an evaluation of prior trip data), and an evaluation block 422 to evaluate data from the downward leg of trip X+1. As indicated, the method 410 may optionally continue for one or more additional trips.

FIG. 4 also shows various computer-readable storage media blocks 413, 415, 417, 419, 421 and 423 (CRM), which may include computer-executable instructions to instruct a computing device to perform one or more acts of the method 410. While individual CRM blocks are shown, a single CRM may include instructions for performing one or more acts associated with the method 410.

As an example, buffered data such as sonic waveform amplitudes for casing arrival can be transmitted via mud-pulse telemetry and be available for evaluation of a cased hole section without requiring continuous pumping over the full length of the cased hole section, which can allow for maximizing tripping speed and consequently saving rig time. Transmission of buffered amplitude data from one or multiple sonic sensor, via mud-pulse telemetry, can be available for surface processing and interpretation and can be used to evaluate cement quality, top of cement, cement bound, cement curing process, optionally before reaching an open hole section (e.g., depending on when pumping has been activated). As an example, status of cement can also help to set one or more whipstocks (e.g., from interpretation of the cement quality).

As an example, pumping of drilling fluid may commence at any particular time during a trip, whether during an upward leg or a downward leg. For example, if an issue arises during a downward leg of a trip (e.g., prior to reaching a lowermost casing shoe), an operator may issue a control signal to a pump to commence pumping of drilling fluid and mud-pulse telemetry to retrieve buffered data, as acquired during the downward leg of the trip. Such a process may allow for evaluation of the buffered data in an effort to address the issue or for one or more other purposes. Similarly, during an upward leg of a trip, should an issue arise, an operator may issue a control signal to a pump to commence pumping of drilling fluid and mud-pulse telemetry to retrieve buffered data, as acquired during the downward leg of the trip, the upward leg of the trip or both.

Figure 5:
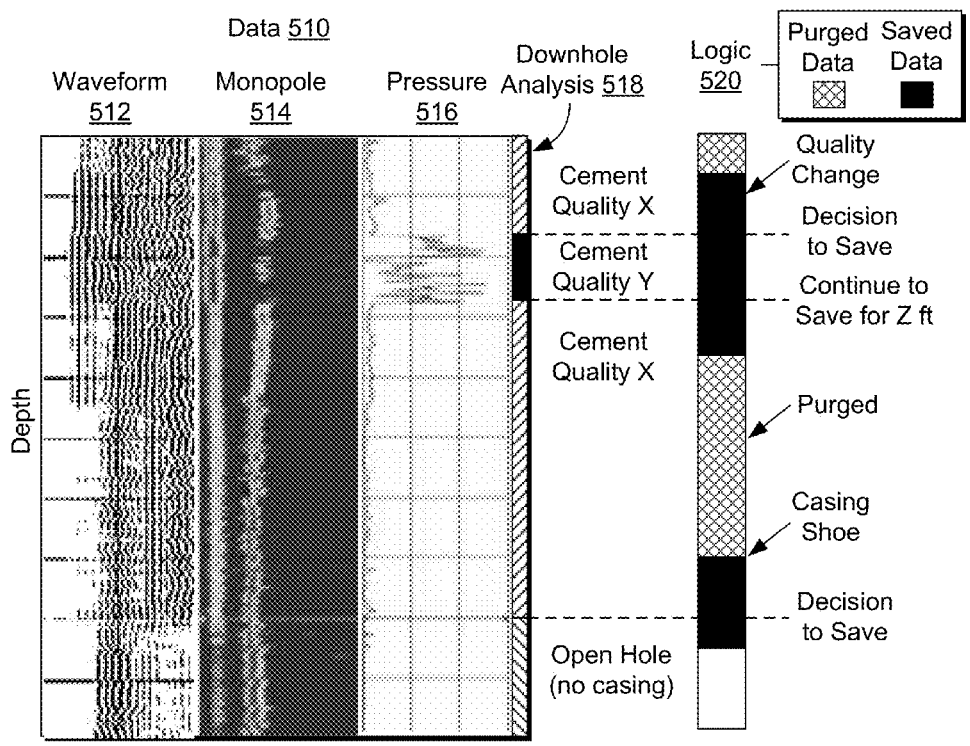
FIG. 5 illustrates examples of data, analysis and logic and an example of a method.
Figure 5:
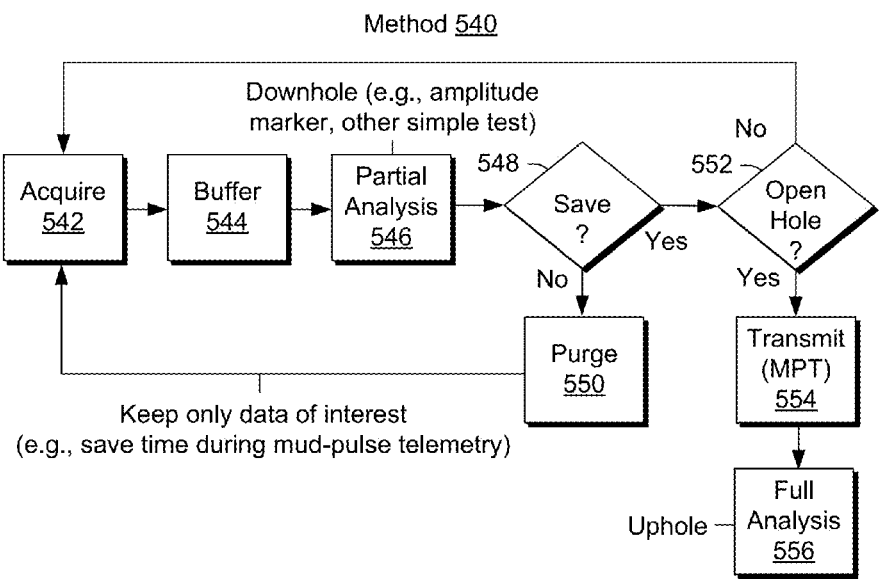

FIG. 5 shows an example of data 510, an example of downhole analysis 518, an example of logic 520 and an example of a method 540. The data 510 includes waveform data 512 versus depth, monopole signal data 514 versus depth and pressure data 516 versus depth. The data 510 may be acquired while moving a tool in a borehole, for example, the data 510 may correspond to data acquired while moving a tool at a rate of about 1000 feet per hour. In the example of FIG. 5, the waveform data 512 may be of the order of several milliseconds in duration (e.g., for various depths) and may be in the form of a variable density log (VDL); the monopole signal data 514 may be slowness data and, for example, include coherence information (e.g., from a slowness time coherence analysis); and the pressure data 516 may optionally be derived from compressional wave information (e.g., P wave), for example, via a slowness-time-projection (STP) process (e.g., within a slowness window, for example, including a slowness of about 60 microseconds per foot).

As an example, a tool may provide for acoustic scanning to acquire borehole compensated long- and short-spaced monopole, cross-dipole, and cement bond quality measurements, for example, for purposes of so-called "analysis behind casing" (ABC). As an example, such a tool may provide for radial measurement of a formation for both near-wellbore and far-field slowness. As an example, an anisotropy algorithm may be provided for characterizing a formation as being isotropic or anisotropic (e.g., optionally with type, cause, etc., of an anisotropy).

Use of cement in a borehole can help isolate one or more zones of interest, for example, consider a zone with hydrocarbon production potential being isolated from a zone with water where cement is introduced to help prevent water mixing with hydrocarbon. As an example, cement may be introduced in an effort to form cement-to-casing and cement-to-formation bonds in one or more zones.

As to some issues that may arise with respect to cement, consider flow problems of mechanical origin, such as poorly centralized pipes in deviated wells, washed-out boreholes, inefficient pre-flushing, and incorrect flow regimes, which may lead to incomplete mud removal in a cement annulus; and degradation of cement slurry during a curing stage, for example, caused by a difference between cement pore pressure and formation pressure. In such an example, when cement dehydrates and start to shrink, pore pressure may become less than formation pressure. As a result, cement quality can be degraded by formation fluids, which may be problematic where such fluid is or includes gas.

In the example of FIG. 5, the downhole analysis 518 is performed by circuitry within a tool while the tool is downhole. As an example, the analysis 518 may provide as a result an indication as to cement quality, for example, consider a quality rating table, which may be relative to a particular borehole. For example, information acquired for portions of a borehole where cement quality is "good" may be used as a basis for judging quality in one or more other portions of the borehole (e.g., based on one or more statistics such as standard deviation, etc.). As an example, a table may provide a numerical rating as to quality (e.g., from 0 to 10, etc.) and optionally another rating as to possible or probable reason as to why quality may be sub-par (e.g., 1 for voids, 2 for infiltration, etc.).

In the example of FIG. 5, the analysis 518 includes two qualities shown as cement quality X and cement quality Y where, for example, cement quality Y is a lesser quality that cement quality X. Given the analysis 518, the logic 520 may make decisions, for example, as to whether or not to save data (e.g., save data, purge data, etc.). As an example, consider the data 510 being acquired while the tool is moved deeper into a borehole. In such an example, data may be initially saved as a default. Where the analysis 518 indicates that a change in cement quality has occurred based at least in part on the data 510, a decision may be made according to the logic 520 to save data. As the decision may occur at a depth that is beyond a possible region of interest, the decision may act to save a portion of data acquired prior to making of the decision. For example, as shown in FIG. 5, the saved data extends to depths above the depth at which the corresponding decision to save occurred. Further, as an example, upon a subsequent change in cement quality, the logic 520 may decide to continue to save data for another number of feet, period of time, etc. In the example of FIG. 5, as no change has occurred over a span of depths, such data may be purged, for example, to free memory, to diminish transmission requirements, etc.

In the example of FIG. 5, the logic 520 also indicates how a decision may be made with respect to sensing a casing shoe, an open hole or both. For example, where the downhole analysis 518 indicates that a casing shoe exists at a particular depth, the logic 520 may call for saving data at that depth and beyond that depth, for example, until the downhole analysis 518 indicates that an open hole (e.g., no casing) region has been reached.

Accordingly, a downhole tool may include circuitry for analysis and logical decision making, for example, as to data storage, data purging, data transmission, etc. While the example of FIG. 5 pertains to a downhole trip, it may also apply to an uphole trip. As an example, a time-lapse approach may consider information acquired from a downhole trip and an uphole trip. For example, if an uphole trip indicates that a possible issue no longer exists (e.g., stabilized, etc.), then the logic 520 may call for purging of corresponding downhole data. As another example, if an uphole trip indicates that a possible issue has worsened, then the logic 520 may call for transmission of relevant information prior to removal of the tool from the borehole. For example, mud flow may be activated for a time sufficient to transmit the relevant information via mud-pulse telemetry (e.g., optionally in absence of a drilling operation). In such a manner, surface equipment may be utilized to assess a possible issue even before a tool has been removed from a borehole.

As to the method 540 of FIG. 5, it includes an acquisition block 542 for acquiring data, a buffer block 544 (e.g., a data storage block) for buffering data, a partial analysis block 546 for performing a partial analysis of acquired data downhole, a decision block 548 for deciding whether to save or purge data, and another decision block 552 for deciding whether an open hole has been reached. As shown, where the decision block 548 decides that data are to be saved, the method 540 continues to the decision block 552; otherwise, it continues to a purge block 550 for purging buffered data and, for example, continuing to the acquisition block 542. As to the decision block 552, if an open hole is not indicated, the method 540 may continue to the acquisition block 542; otherwise, upon indication of an open hole, the method 540 may continue to a transmission block 554 for transmitting information (e.g., saved data, etc.) and thereafter a full analysis block 556 for performing a full analysis of the transmitted information (e.g., uphole using surface equipment). In such an example, a full analysis performed by the block 556 may include making one or more decisions as to a drilling operation to occur in the open hole portion, for example, to deepen the hole. In such a manner, decision making may occur without having to wait for removal of the tool from the hole. Such decision making may be based, for example, on one or more characteristics of cement positioned in the hole (e.g., between a casing and a hole wall). As an example, where cement fails to block intrusion of water, the tool may be removed (tripped upward) and the cement issue remediated prior to tripping a drill string downward to drill the hole deeper.

Figure 6:
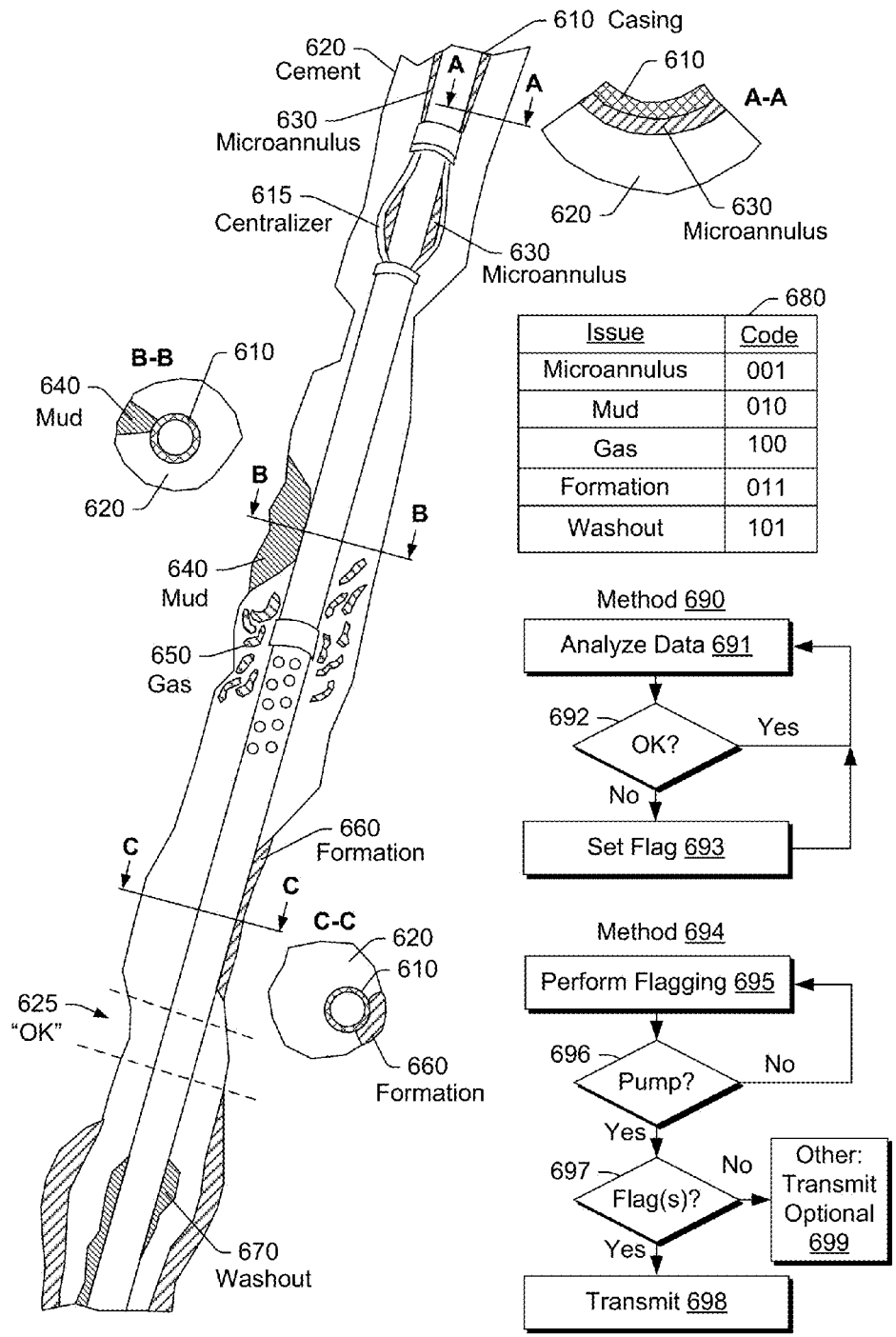
FIG. 6 illustrates some examples of cement-related issues, an example of a table that associates issues with codes and examples of methods.

FIG. 6 shows an example of a casing 610 disposed in a borehole of a formation 660 that includes cement 620 along with various cement-related issues. From the top moving downward, FIG. 6 illustrates a microannulus 630 disposed between the casing 610 and the cement 620 (see, e.g., cross-section along line A-A), a centralizer 615 disposed with respect to the casing 610 and a microannulus 630, channeling of mud 640 in cement 620 (e.g., possibly caused by slight deviation and eccentered casing, see, e.g., cross-section along line B-B), gas 650 invasion of the cement 620, the casing 610 in contact with the formation 660 (e.g., where the cement 620 is passed along an opposing free side, see, e.g., cross-section along line C-C), and the casing 610 surrounded at least in part by a washed-out zone 670 (e.g., incomplete mud displacement caused by inefficient flow rate). Also shown in FIG. 6 is a section where the casing 610 is surrounded and substantially centered by cement of good quality 625 (e.g., acceptable or "OK" quality).

As an example, one or more issues may be associated with a code, for example, as shown in a table 680. In such an example, an analysis of data may indicate that a particular cement issue may exist and associate that data with a code. As an example, the codes may be ranked as to priority, for example, where a washout has a higher priority than gas intrusion, which has a higher priority than a microannulus. In such a manner, data transmission may transmit data in a hierarchical manner, for example, transmitting higher priority data prior to lower priority data (e.g., based on an issue or other indicator). In such a manner, available bandwidth may be devoted to a higher priority potential or actual issue. As a method may aim to save time, transmission of data assigned a higher priority before transmission of data assigned a lower priority may give more time for analysis of the higher priority data (e.g., using surface equipment). As an example, a table that includes one or more codes (e.g., flagged codes, etc.) may be transmitted uphole to uphole equipment, the table analyzed by the uphole equipment and, in turn, one or more sets of data requested (e.g., by downhole transmission of one or more codes, etc.) to transmit such data to the uphole equipment.

As an example, individual issues in the example of FIG. 6 may have one or more differentiating characteristics that can be distinguished in acquired data. For example, a microannulus may yield a different signal than gas voids. As an example, acquired data may be analyzed downhole for one or more differentiating characteristics where such one or more differentiating characteristics may be used to rank the data as to priority, optionally by associating the data with a code. As an example, a tool may include programmable logic for associating a code with data and optionally calling for storage or purging of such data based at least in part on an assigned code. For example, where presence of mud is not of interest (see, e.g., the mud 640 in contact with the casing 610) and where gas voids are of interest (see, e.g., the gas 650), logic may call for saving data associated with gas voids while purging data associated with mud. In such an example, given the nature of mud versus gas voids, data may be analyzed to differentiate the two conditions and make such decisions while the tool is downhole. Such an approach can facilitate collection and transmission of data that is of interest, which may expedite an assessment as well as reduce data transmission demands when compared to an approach that calls for transmission of data without application of a differentiation criterion or criteria.

As an example, a downhole analysis may include analyzing data with respect to one or more limits (e.g., amplitude limits), a slope with respect to depth, a slope with respect to time, etc. As an example, a change in slope as in the pressure data 516 of FIG. 5 (based on a waveform analysis) may result in one or more actions/triggers (e.g., optionally to set a code, a flag, etc.).

FIG. 6 also shows an example of a method 690 and an example of a method 694, which may be performed cooperatively. The method 690 includes an analysis block 691 for analyzing data, a decision block 692 for deciding whether the data are indicative of an issue or issues, and a set block 693 for setting a flag, for example, that is associated with the analyzed data. In such an example, a flag may act to cause data to be retained in memory of a downhole tool rather than being purged. As an example, a flag may be stored in memory of a downhole tool along with one or more codes or other identifiers, for example, optionally as to a type of issue as shown in the table 680. As an example, a flag may be a time-stamped and thereby link to time-stamped data (e.g., a single time, a series of times, a range of time, ranges of times, etc.). As an example, a flag may be associated with an approximate depth or approximate depths, optionally along with a time or times. As an example, a flag may be or include a code.

As to the method 694, it includes a performance block 695 for performing flagging, for example, as in the method 690; a decision block 696 for deciding whether pumping has commenced (e.g., mud pumping); a decision block 697 for deciding whether one or more flags have been set; a transmission block 698 for transmission of information (e.g., uphole) if one or more flags have been set; and an other action block 699, for example, where transmission of information may be optional. In the method 694, as an example, where the transmission block 698 transmits information, it may be data analyzed per a flagging method such as the method 690 where that data have been stored in memory of a downhole tool. As an example, such information may be information stemming from an analysis of data, for example, it may include one or more codes (see, e.g., codes in the table 680), or other information.

As an example, the methods 690 and 694 may operate in a collaborative manner (e.g., substantially simultaneously) such that when mud pumping commences through a downhole tool, logic within the downhole tool can call for transmission of information uphole via mud-pulse telemetry. In such an example, transmission of information may occur if one or more flags have been set that cause the logic of the downhole tool to call for such transmission of information. In turn, once information is received uphole, one or more decisions may be made, which may affect one or more operations being performed or to be performed. For example, depending on the nature of an issue, pumping of mud may be halted, drilling may be halted, etc., and one or more remedial actions performed to address a potential issue or issues associated with cement (see, e.g., the various examples of issues in FIG. 6).

As an example, a downhole tool may include circuitry for acquiring data germane to one or more characteristics of cement, logic for analysis of acquired data, logic for setting one or more flags (e.g., optionally tagging data, for example, with a code or other indicator), and logic for calling for uphole transmission of information (e.g., data, etc.) based at least in part on one or more flags having been set. In such an example, where the downhole tool sees a dramatic change in data amplitude, slope, etc., it may call for transmission of information uphole upon commencement of mud pumping (e.g., transmission of the information via mud-pulse telemetry).

As an example, a method may include transmitting one or more flags from a downhole tool uphole upon commencement of mud pumping through the downhole tool. In turn, an uphole analysis of the one or more flags (e.g., codes, etc.) may be performed to determine whether information stored in the downhole tool merits transmission uphole. For example, the downhole tool may have retained waveform data, monopole data, pressure data, etc. that are associated with a flag that has been transmitted uphole. As an example, where a flag corresponds to a known issue (e.g., or a known "false positive"), a decision may be made to not transmit associated information (e.g., data, etc.) from the downhole tool uphole. Where a plurality of flags have been transmitted uphole, they may be analyzed, optionally based on a priority scheme, to decide when and whether to call for uphole transmission of associated information stored in the downhole tool.

As an example, by implementing a flagging technique, a relatively small amount of information may be transmitted uphole using mud-pulse telemetry (e.g., upon commencement of mud pumping) where further decision making may be made. Such an approach may expedite operations, increase confidence in operational decision making, increase confidence in structural integrity (e.g., of downhole tubing that includes cement support), etc.

Figure 7:
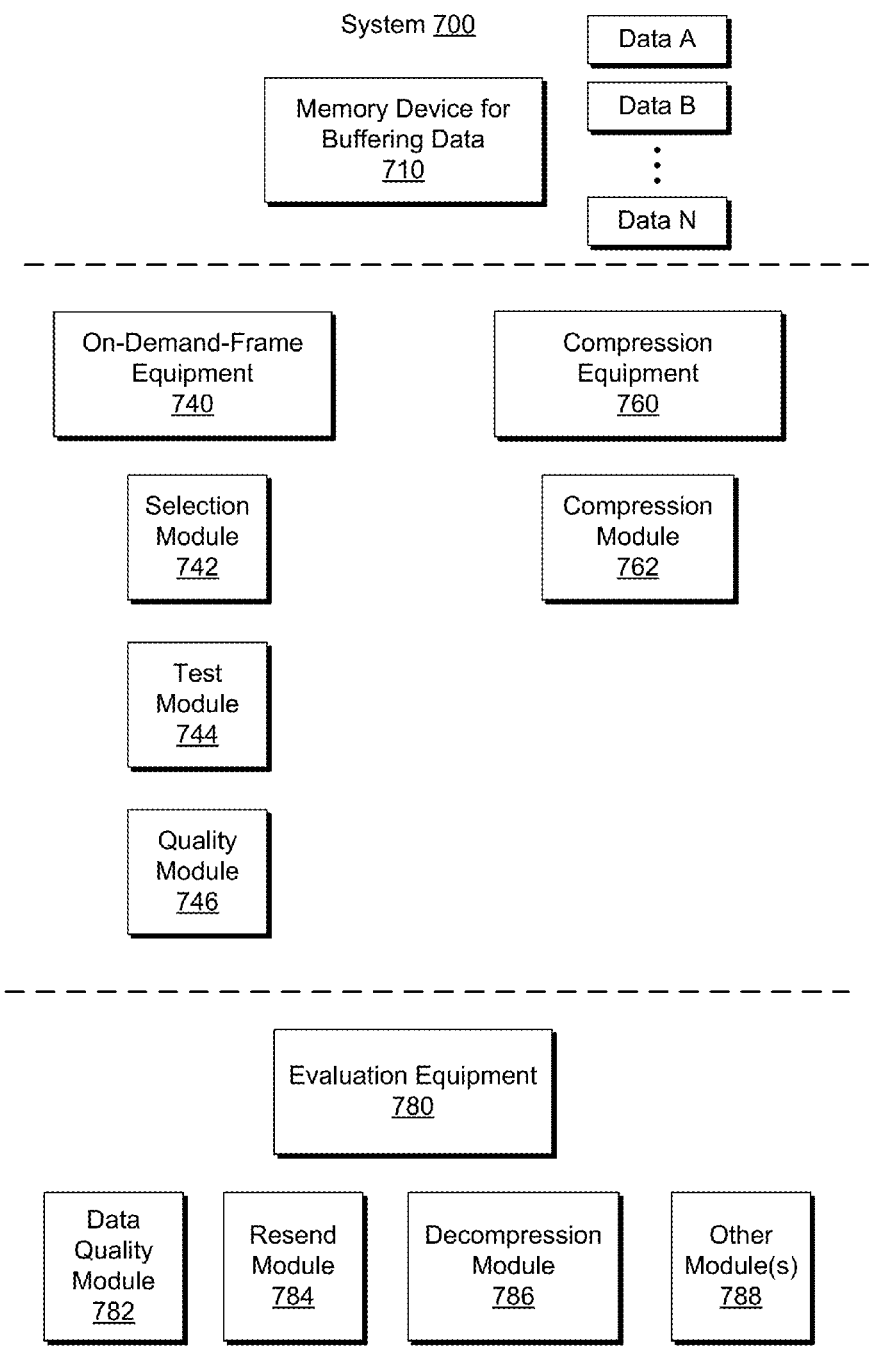
FIG. 7 illustrates an example of a system.

As an example, transmission of buffered data (e.g., information) may include implementation of one or more of an on-demand-frame technique, a compression technique, etc. FIG. 7 shows an example system where a memory device for buffering data 710 can provide buffered data to on-demand-frame equipment 740 and/or compression equipment 760, which, in turn, may be provided to evaluation equipment 780. In such an example, support of on-demand-frame technology and compression technology can help to maximize an available telemetry bandwidth. As an example, a specific telemetry frame may be used for a defined time or, for example, modified with support of a downlink as data are may be desired to the casing point and not in the open hole section.

As an example, an on-demand-frame technique may be applied for transmission of one or more flags (e.g., optionally without data that may have given rise to the one or more flags). As an example, an on-demand frame technique may be implemented responsive to receipt of one or more flags uphole. For example, as one or more flags may be relatively small in terms of data size, transmission of such flag or flags may occur using a technique that does not necessarily aim to maximize available bandwidth. In turn, where an analysis of one or more flags uphole occurs, which indicates that data are substantial (e.g., amount of data in bits, bytes, etc.), in turn, a call may be issued to call for uphole transmission of such data using a technique that aims to reduce bandwidth for transmission of such data.

As shown in FIG. 7, the memory device 710 may include various data (e.g., Data A, Data B, etc.), which may be from one or more sensors, one or more tools, one or more periods of time, one or more trip legs, etc. As an example, the one-demand-frame equipment 740 may include a selection module 742 to select certain data, a test module 744 to implement a test and a quality module 746 to assess quality (e.g., of transmission environment, of transmitted data, etc., e.g., optionally responsive to a test). As shown, the compression equipment 660 includes a compression module 762 that may include one or more compression algorithms for compression of acquired data, buffered data, data to be transmitted, etc. As to the evaluation equipment 780, as an example, it may include a data quality module 782 to assess data quality, a resend module 784 to call for retransmission of data (e.g., where a transmission environment has impacted data quality), a decompression module 786 for decompression of compressed data and optionally one or more other modules 788.

As an example, the on-demand-frame equipment 740 may include one or more features of the On Demand Frame™ (ODF) technology marketed by Schlumberger Ltd. (Houston, Tex.). As an example, annulus pressure information may be acquired, which may provide for more confidence in decision making as to a data transmission test. For example, if the annulus pressure varies substantially over time with respect to the underlying test data pressures, then a decision may be made to abort the test and to not send any data. As an example, data may be buffered data as acquired during a downward leg of a trip where such data can be evaluated to determine one or more aspects of cement disposed in a region between a casing and surrounding earth. Where a decision is made to abort, an attempt to retransmit may be made, for example, for a time when annulus pressure is expected to become more stable.

As an example, the compression equipment 760 of FIG. 7 may include one or more features of the ORION II™ telemetry platform marketed by Schlumberger Ltd. (Houston, Tex.). As well depth increases, mud-pulse pressure signals generated by telemetry equipment deep in the well may weaken and decrease in signal-to-noise ratio. To mitigate such phenomena, the ORION II™ technology includes compression algorithms that can increase the quantity of data transmitted at a given physical telemetry rate as well as signal modulation techniques that can push mud-pulse signals further (e.g., along a wellbore). As an example of a data transmission rate using the ORION II™ technology during a drilling operation, consider transmission of 60 curves at 2 data points per foot at a drilling speed of 250 ft/h and about 1.5 bps at a depth of over about 40,000 ft (e.g., via TeleScope™ high-speed telemetry service marketed by Schlumberger Ltd. running of the ORION II™ telemetry platform).

The ORION II™ technology also provides for transmission of so-called "downlink" commands. Downlink commands can be transmitted from surface equipment (e.g., uphole or remote equipment) to downhole equipment. For example, various equipment included in a drill string may be instructed through use of one or more downlink commands (e.g., consider PowerDrive RSS™ or various MWD tools marketed by Schlumberger Ltd.).

As an example, one or more features of the ORION II™ technology may be implemented with respect to an LWD tool configured to acquire information germane to cement (e.g., consider the aforementioned SonicScope™ tool marketed by Schlumberger Ltd.).

As an example, where downlink technology is available, a method can include transmitting a downlink command to downhole equipment to act with respect to buffered data. For example, such a downlink command may be issued during pumping of drilling fluid to initiate transmission of buffered data via mud-pulse telemetry. As an example, on-demand-frame and compression technologies may be implemented to maximize available telemetry bandwidth and a specific telemetry frame can be used for a defined time or modified with the support of downlink technology, for example, as data may be desired to the casing point and not in an open hole section.

Figure 8:
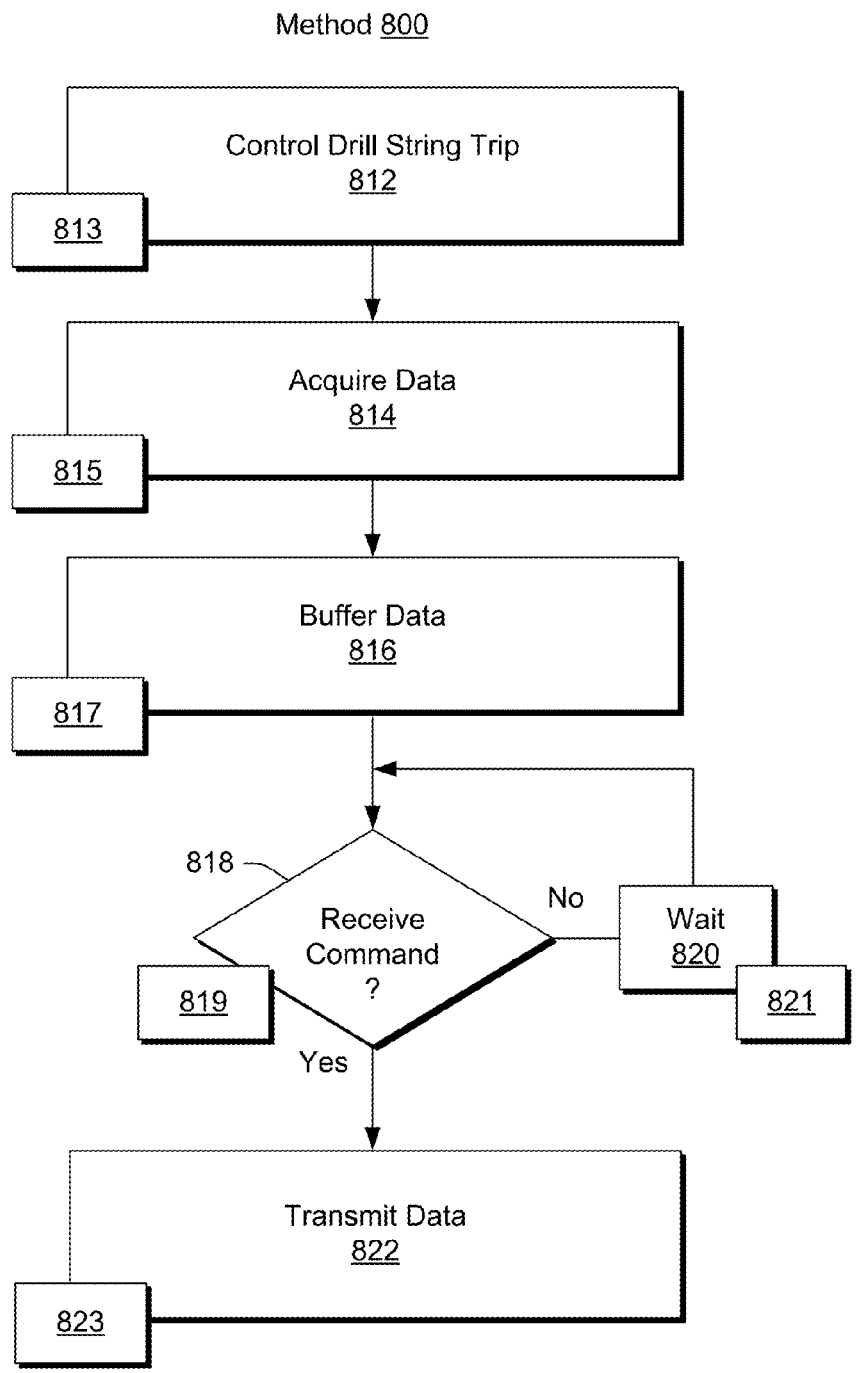
FIG. 8 illustrates an example of a method.

FIG. 8 shows an example of a method 800 that includes a control block 812 for controlling a drill string trip, an acquisition block 814 for acquiring data during the trip, a buffer block 816 for buffering acquired data during the trip, a decision block 818 for deciding whether a command has been received, and a transmission block 822 for transmitting data based at least in part on a decision of the decision block 818. For example, where the decision block 818 decides that a command has been received such as a downlink command, the method 800 may continue to the transmission block 822 and transmit at least a portion of the buffered data as buffered according to the buffer block 816. However, where the decision block 818 decides that a command has not been received such as a downlink command (e.g., associated with or otherwise germane to the buffered data), then the method 800 may enter a wait block 820 or take other action.

As an example, the wait block 820 of the method 800 may be part of a loop about the decision block 818, which may be entered after or during acquisition of data, buffering of data, etc. (e.g., at any time during a downward leg of a trip, at the end of a trip, after an end of a trip, during an upward leg of a trip, etc.).

FIG. 8 also shows various computer-readable storage media blocks 813, 815, 817, 819, 821 and 823 (CRM), which may include computer-executable instructions to instruct a computing device to perform one or more acts of the method 800. While individual CRM blocks are shown, a single CRM may include instructions for performing one or more acts associated with the method 800.

Figure 9:
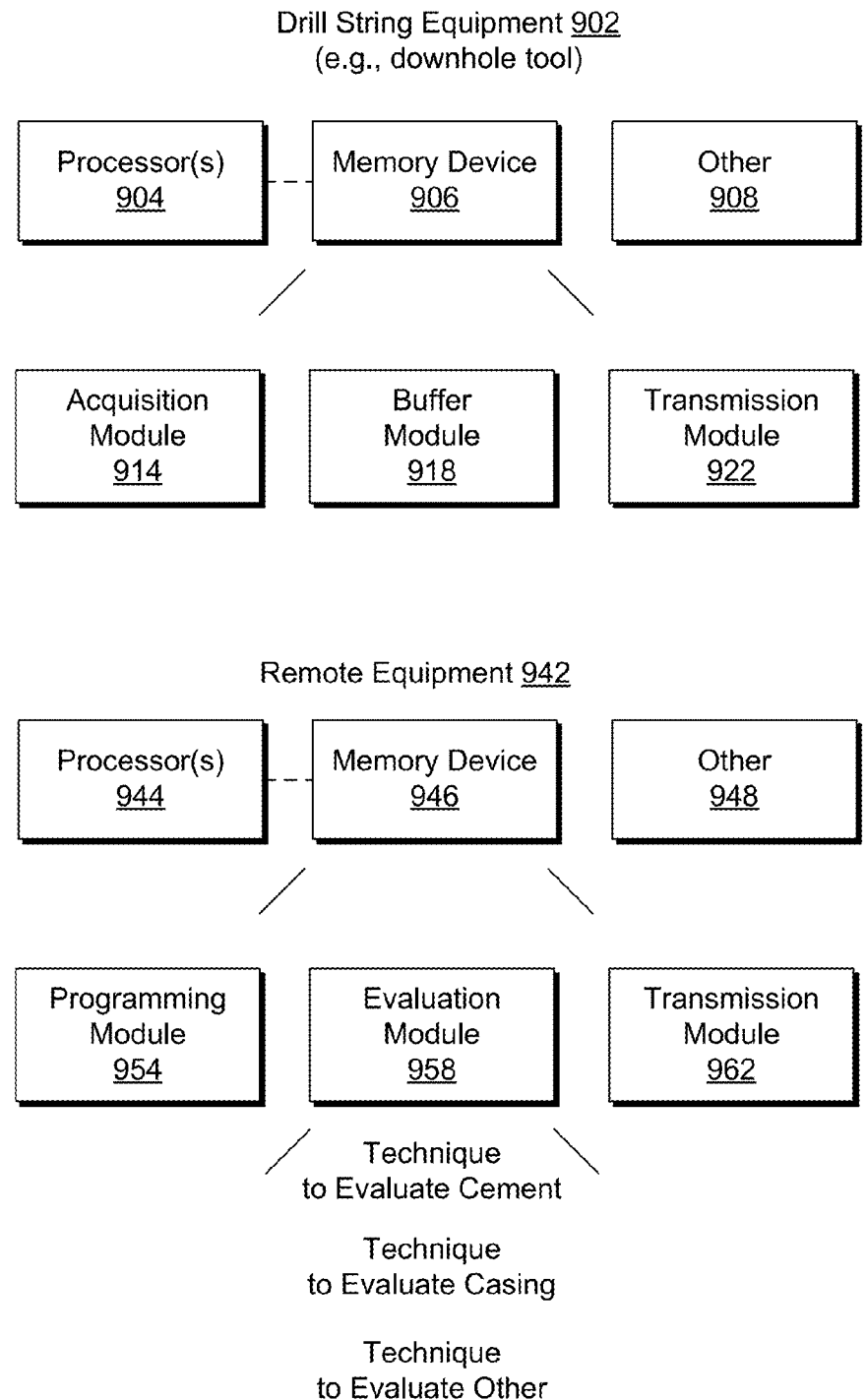
FIG. 9 illustrates an example of drill string equipment and an example of remote equipment.

FIG. 9 shows an example of drill string equipment 902 and an example of remote equipment 942. As an example, the drill string equipment 902 may be a downhole tool mountable in a drill string that includes one or more processors 904, a memory device 906 with memory accessible by at least one of the one or more processors, and processor-executable instructions that may be stored in the memory of the memory device 906 and executable by at least one of the one or more processors 904, and one or more other components 908.

As an example, such instructions may be in the form of a module or modules. In the example of FIG. 9, such modules may include an acquisition module 914 for instructing equipment to acquire data via a receiver mounted in a drill string during tripping of the drill string downward into a wellbore (e.g., that includes a casing and a cement annulus about the casing) where the acquired data conforms to a technique for evaluation of at least one characteristic of cement; a buffer module 918 for instructing equipment to buffer at least a portion of the acquired data to a memory device mounted in the drill string; and a transmission module 922 for instructing equipment to transmit at least a portion of the buffered data via mud-pulse telemetry (e.g., while pumping drilling fluid through a passage in the drill string, as disposed in the wellbore). As an example, the drill string equipment 902 may include one or more modules to instruct a processor (e.g., the processor(s) 904) to perform a flagging method (see, e.g., the method 690 of FIG. 6), to perform a flag checking method (see, e.g., the method 694 of FIG. 6), etc. As an example, the transmission module 922 may include instructions to instruct a processor (e.g., the processor(s) 904) to transmit one or more flags, optionally as codes (e.g., or with codes, other information, etc.).

As an example, a module may be provided for instructing equipment to implement one or more compression algorithms to compress acquired data, buffered data or acquired data and buffered data. As an example, a module may be provided for instructing equipment to receive a downlink command and to initiate transmission of at least a portion of buffered data via mud-pulse telemetry responsive to the received downlink command. As an example, a module may be provided for instructing equipment to transmit data according to an on-demand-frame technology.

As to the remote equipment 942 of FIG. 9, it may include one or more processors 944, a memory device 946 and one or more other components 948. As an example, the remote equipment 942 may include one or more computer-readable storage media including computer-executable instructions to instruct a computing device to perform various acts. For example, instructions may be provided in the form of a module or modules such as a programming module 954, an evaluation module 958 and a transmission module 962.

As to the programming module 954, it may provide for instructing equipment to program one or more data acquisition periods for data acquisition equipment of a drill string during a downward leg of a trip of the drill string into a wellbore, the to be acquired data conforming to a technique for evaluation of at least one characteristic of cement. As to the evaluation module 958, it may provide for instructing equipment to, in accordance with a technique for evaluation of at least one characteristic of cement, evaluate at least a portion of acquired data as received via mud-pulse telemetry during pumping of drilling fluid through a passage of the drill string with the drill string disposed in the wellbore. As an example, the programming module 954 may further provide for instructing equipment to, based at least in part on an evaluation, program one or more subsequent data acquisition periods for data acquisition equipment or other data acquisition to be tripped in a wellbore. For example, as explained with respect to the method 510 of FIG. 5, data from one leg of a trip may inform programming of another leg of that trip or a leg of another trip.

As an example, a module may provide for programming one or more subsequent data acquisition periods for data acquisition equipment for an upward leg of a trip of a drill string based on an evaluation of data from a downward leg of that trip. As an example, one or more subsequent data acquisition periods may be for a subsequent downward leg of a trip of a drill string or another drill string in a wellbore as informed by an evaluation of prior data.

As an example, one or more computer-readable storage media can include computer-executable instructions to instruct a computing device to transmit a downlink command during pumping of drilling fluid through a passage of a drill string. In such an example, the downlink command may be a command that calls for initiation of transmission of data acquired according to one or more programmed data acquisition periods.

As an example, the remote equipment 942 of FIG. 9 may include a module with instructions for analyzing one or more flags received from drill string equipment such as the drill string equipment 902. In turn, such a module may call for transmission of additional information from the drill string equipment (e.g., where the analysis of the one or more flags indicates that an issue may exist with respect to downhole cement, etc.). As an example, where a downlink command calls for initiation of transmission of data acquired according to one or more programmed data acquisition periods, the call may be based at least in part on a previously received flag, received via mud-pulse telemetry, for example, where the flag is associated with the one or more programmed data acquisition periods and at least one of a plurality of cement-related issues (see, e.g., the methods 690 and 694 and the table 680 of FIG. 6).

Figure 10:
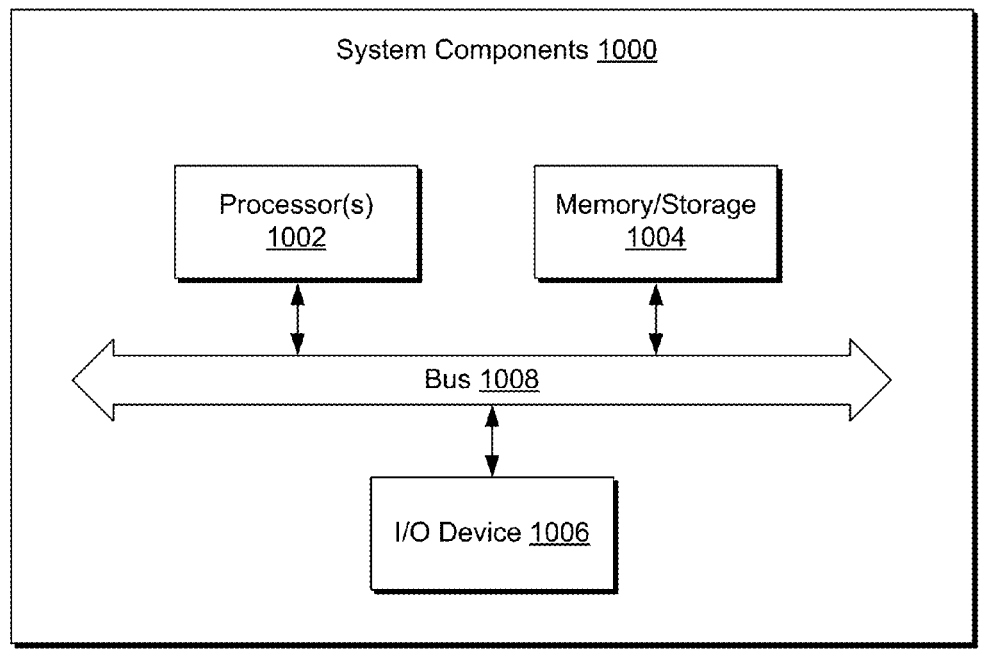
FIG. 10 illustrates example components of a system and a networked system.
Figure 10:
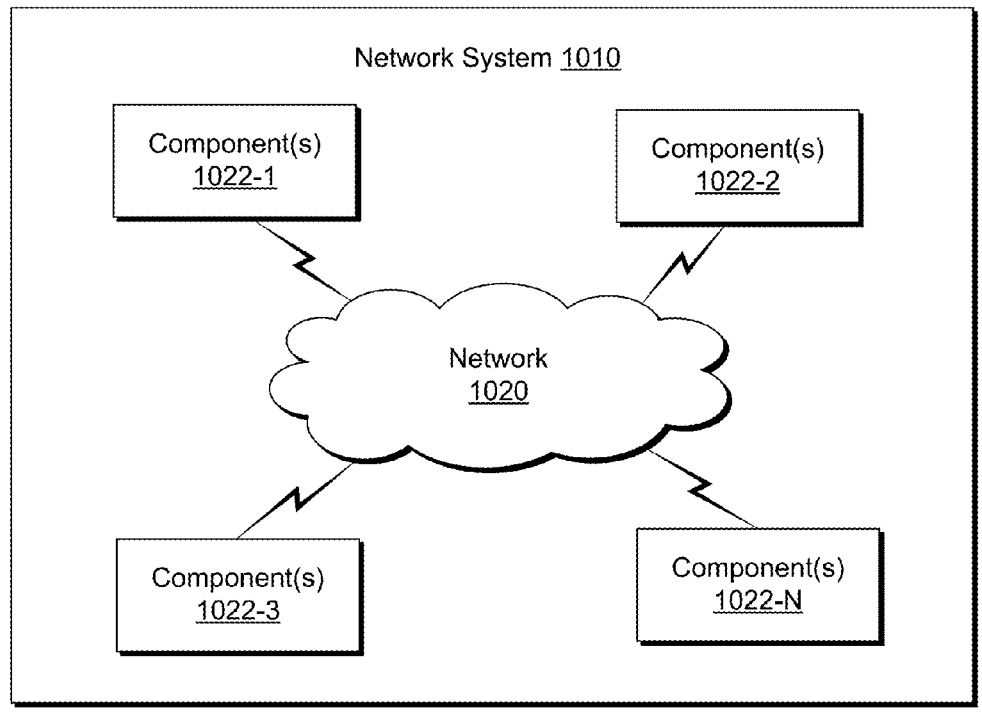

FIG. 10 shows components of an example of a computing system 1000 and an example of a networked system 1010. The system 1000 includes one or more processors 1002, memory and/or storage components 1004, one or more input and/or output devices 1006 and a bus 1008. In an example embodiment, instructions may be stored in one or more computer-readable media (e.g., memory/storage components 1004). Such instructions may be read by one or more processors (e.g., the processor(s) 1002) via a communication bus (e.g., the bus 1008), which may be wired or wireless. The one or more processors may execute such instructions to implement (wholly or in part) one or more attributes (e.g., as part of a method). A user may view output from and interact with a process via an I/O device (e.g., the device 1006). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1010. The network system 1010 includes components 1022-1, 1022-2, 1022-3, . . . 1022-N. For example, the components 1022-1 may include the processor(s) 1002 while the component(s) 1022-3 may include memory accessible by the processor(s) 1002. Further, the component(s) 1002-2 may include an I/O device for display and optionally interaction with a method. The network may be or include the Internet, an intranet, a cellular network, a satellite network, etc.

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    acquiring data via a receiver mounted in a drill string during tripping of the drill string downward into a wellbore that comprises a casing and a cement annulus about the casing, the acquired data for evaluation of at least one characteristic of cement;
    buffering at least a portion of the acquired data to a memory device mounted in the drill string;
    commencing pumping of drilling fluid through a passage in the drill string after passing a casing shoe of the casing;
    receiving a downlink command while pumping the drilling fluid through the passage in the drill string wherein the downlink command calls for acquiring data during tripping of the drill string upward in the wellbore;
    while pumping the drilling fluid through the passage in the drill string, as disposed in the wellbore, transmitting at least a portion of the buffered data via mud-pulse telemetry;
    using one or more compression algorithms implemented by compression circuitry in the drill string; and compressing the acquired data, compressing the buffered data or compressing the acquired data and the buffered data.

2. The method of claim 1 comprising receiving at least a portion of the transmitted buffered data at a remote location via the mud-pulse telemetry and evaluating at least one characteristic of cement in the cement annulus based on the received data.

3. The method of claim 1 comprising programming data acquisition circuitry in the drill string prior to tripping the drill string.

4. The method of claim 3 wherein the programming is based in part on a technique for evaluation of at least one characteristic of cement.

5. The method of claim 3 wherein the programming is based in part on data acquired during a prior trip of the drill string into the wellbore.

6. The method of claim 1 wherein the evaluation of at least one characteristic of cement provides for evaluation of at least one member selected from a group consisting of cement quality, top of cement, cement bound, and cement curing.

7. The method of claim 1 comprising receiving at least a portion of the transmitted buffered data at a remote location via the mud-pulse telemetry and evaluating at least one characteristic of cement disposed in the wellbore while using the drill string to drill and enlarge the wellbore.

8. The method of claim 1 comprising receiving a downlink command while pumping the drilling fluid through the passage in the drill string wherein the downlink command calls for the transmitting at least a portion of the buffered data via the mud-pulse telemetry.

9. The method of claim 8 wherein the downlink command is issued in response to a flag transmitted previously via the mud-pulse telemetry wherein the flag is associated with a portion of the buffered data to be transmitted via the mud-pulse telemetry.

10. A downhole tool mountable in a drill string, the downhole tool comprising:
one or more processors;
a memory device with memory accessible by at least one of the one or more processors; and
processor-executable instructions stored in the memory of the memory device and executable by at least one of the one or more processors to acquire data via a receiver mounted in a drill string during tripping of the drill string downward into a wellbore that comprises a casing and a cement annulus about the casing, the acquired data for evaluation of at least one characteristic of cement;
buffer at least a portion of the acquired data to the memory device mounted in the drill string;
commence pumping of drilling fluid through a passage in the drill string after passing a casing shoe of the casing;
receive a downlink command and to initiate transmission of at least a portion of the buffered data via the mud-pulse telemetry responsive to the received downlink command;
while pumping the drilling fluid through the passage in the drill string, as disposed in the wellbore, transmit at least a portion of the buffered data via the mud-pulse telemetry; and
implement one or more compression algorithms to compress the acquired data, the buffered data or the acquired data and the buffered data.

11. The system of claim 10 comprising processor-executable instructions stored in the memory of the memory device and executable by at least one of the one or more processors to analyze at least a portion of the acquired data and to set a flag based at least in part on the analysis, the flag being associated with a portion of the acquired data.

12. One or more non-transitory computer-readable storage media comprising computer-executable instructions to instruct a computing device to:
program one or more data acquisition periods for data acquisition equipment of a drill string during a downward leg of a trip of the drill string into a wellbore, the acquired data for evaluation of at least one characteristic of cement, for storage in the drill string, and for transmission by mud-pulse telemetry during pumping of drilling fluid through a passage of the drill string with the drill string disposed in the wellbore after the drill string reaches a position past a casing shoe of a casing of the wellbore;
program one or more compression algorithms to compress the acquired data;
evaluate at least a portion of the acquired data as received via the mud-pulse telemetry; and
based at least in part on the evaluation, program one or more subsequent data acquisition periods for the data acquisition equipment or other data acquisition to be tripped in the wellbore, wherein the one or more subsequent data acquisition periods for the data acquisition equipment comprise one or more data acquisition periods for an upward leg of the trip of the drill string.

13. The one or more non-transitory computer-readable storage media of claim 12 comprising computer-executable instructions to instruct a computing device to transmit a downlink command during pumping of the drilling fluid through the passage of the drill string.

14. The one or more non-transitory computer-readable storage media of claim 13 wherein the downlink command calls for initiation of transmission of data acquired according to the one or more programmed data acquisition periods based at least in part on a previously received flag, received via the mud-pulse telemetry, the flag being associated with the one or more programmed data acquisition periods and at least one of a plurality of cement-related issues.

* * * * *